(12) United States Patent
Borden

(10) Patent No.: US 11,857,109 B2
(45) Date of Patent: Jan. 2, 2024

(54) OIL-LESS FRYER STAND DEVICE

(71) Applicant: Stephen Borden, Orlando, FL (US)

(72) Inventor: Stephen Borden, Orlando, FL (US)

( * ) Notice: Subject to any disclaimer, the term of this patent is extended or adjusted under 35 U.S.C. 154(b) by 95 days.

(21) Appl. No.: 17/489,077

(22) Filed: Sep. 29, 2021

(65) Prior Publication Data
US 2023/0106950 A1  Apr. 6, 2023

(51) Int. Cl.
*A47J 37/04* (2006.01)
*A47J 27/00* (2006.01)

(52) U.S. Cl.
CPC ........... *A47J 37/043* (2013.01); *A47J 27/002* (2013.01)

(58) Field of Classification Search
CPC .............................. A47J 37/043; A47J 27/002
USPC ......................................................... 99/421 R
See application file for complete search history.

(56) References Cited

U.S. PATENT DOCUMENTS

| | | | | |
|---|---|---|---|---|
| 2,049,481 A | * | 8/1936 | Walterspiel | A47J 37/043 |
| | | | | 99/422 |
| 2,181,847 A | * | 11/1939 | Finizio | A47J 37/043 |
| | | | | 99/446 |
| 2,549,019 A | * | 4/1951 | Saunders | A47J 37/043 |
| | | | | 99/341 |
| 2,920,177 A | * | 1/1960 | Brane | A47J 37/046 |
| | | | | 99/391 |
| 3,221,638 A | * | 12/1965 | Wickenberg | A47J 37/043 |
| | | | | 99/393 |
| 3,294,548 A | * | 12/1966 | Vischer, Jr. | A23L 5/13 |
| | | | | 426/523 |
| 3,502,019 A | * | 3/1970 | Koons, Jr. | A47J 37/041 |
| | | | | 74/571.11 |
| 3,503,323 A | * | 3/1970 | Swetlitz | F24C 15/164 |
| | | | | 99/450 |
| 3,511,167 A | * | 5/1970 | Holtkamp | A47J 37/041 |
| | | | | 374/155 |
| 3,598,611 A | * | 8/1971 | Swetlitz | F24C 15/14 |
| | | | | 426/523 |
| 3,604,338 A | * | 9/1971 | Fiedler | A47J 37/046 |
| | | | | 99/393 |
| 3,604,341 A | * | 9/1971 | Coroneos | A47J 37/043 |
| | | | | 99/421 V |
| 3,817,164 A | * | 6/1974 | Hintze | A47J 37/043 |
| | | | | 99/421 V |
| 3,956,979 A | * | 5/1976 | Coroneos | A47J 37/043 |
| | | | | 99/421 V |

(Continued)

*Primary Examiner* — Eric S Stapleton
(74) *Attorney, Agent, or Firm* — Jason T. Daniel, Esq.; Daniel Law Offices, P.A.

(57) ABSTRACT

An oil-less frying stand device includes a main body having plurality of elongated legs, an upper shelf, a lower shelf, and a plurality of wheels. The lower shelf includes an enlarged opening for receiving and engaging a 20 lb propane tank. A hollow pipe extends upward from the top surface of the upper shelf. The pipe includes an open top end for receiving an elongated rotisserie spit, and a rotisserie motor is positioned along the bottom end of the hollow pipe. The pipe includes a circular shape and size that is suitable for insertion within the drain opening of a commercially available oil-less fat frying device. A drain opening is positioned along the top shelf at a location adjacent to the hollow pipe, and a circular-shaped lip encircles both the drain opening and the pipe. A drain tube is in communication with the bottom end of the drain opening to remove liquids from the area within the circular lip.

15 Claims, 5 Drawing Sheets

(56) References Cited

U.S. PATENT DOCUMENTS

| | | | |
|---|---|---|---|
| 3,960,067 A * | 6/1976 | Dutchburn | A47J 37/041 99/421 H |
| 3,988,930 A * | 11/1976 | Fitzmayer | G12B 17/02 219/712 |
| 3,991,615 A * | 11/1976 | Hornung | G01K 1/08 219/712 |
| 4,270,444 A * | 6/1981 | Geissmann | A47J 37/043 99/341 |
| 4,300,443 A * | 11/1981 | Morcos | A47J 37/043 99/332 |
| 4,355,569 A * | 10/1982 | Sage | A47J 37/047 99/441 |
| 4,366,750 A * | 1/1983 | Brown | A47J 37/043 99/421 V |
| 4,512,248 A * | 4/1985 | Volakakis | A47J 37/043 99/421 V |
| 4,697,506 A * | 10/1987 | Ducate, Jr. | A23B 4/0523 126/41 R |
| 4,717,802 A * | 1/1988 | Colato | H05B 6/6411 126/41 A |
| 4,895,068 A * | 1/1990 | Hanagan | A47J 37/0713 99/357 |
| 4,979,439 A * | 12/1990 | Ferron-Zepeda | A47J 27/16 99/421 V |
| 5,086,752 A * | 2/1992 | Hait | F24C 1/16 126/25 R |
| 5,101,715 A * | 4/1992 | Liu | A47J 37/043 99/421 V |
| 5,307,789 A * | 5/1994 | Newby | F24C 3/14 126/30 |
| 5,357,853 A * | 10/1994 | Nelson | B26D 1/18 99/421 V |
| 5,518,127 A * | 5/1996 | Warmack | A47F 9/00 126/25 R |
| 5,907,994 A * | 6/1999 | Dotan | A47J 37/043 99/332 |
| 5,910,332 A * | 6/1999 | Fakieh | A47J 37/042 426/523 |
| 6,038,965 A * | 3/2000 | Thorndyke | A47J 37/0682 99/449 |
| 6,142,064 A * | 11/2000 | Backus | A47J 37/047 99/421 H |
| 6,173,645 B1 * | 1/2001 | Backus | A47J 37/042 220/326 |
| 6,363,836 B1 * | 4/2002 | Usherovich | A47J 37/043 99/421 V |
| 6,837,149 B1 * | 1/2005 | Tsontakis | A47J 37/046 99/421 V |
| 6,988,445 B1 * | 1/2006 | Backus | A47J 37/042 99/421 H |
| 7,021,201 B1 * | 4/2006 | Ducate, Sr. | A47J 37/0652 99/447 |
| 7,325,484 B1 * | 2/2008 | Backus | A47J 37/0664 99/421 H |
| 8,087,352 B2 * | 1/2012 | Thompson | A47J 37/041 99/421 H |
| 8,408,120 B2 * | 4/2013 | Georgis | A47J 37/043 99/421 V |
| 8,677,891 B2 * | 3/2014 | Stier | A47J 37/0731 99/421 R |
| 2001/0009128 A1 * | 7/2001 | Backus | A47J 37/043 99/421 H |
| 2001/0039884 A1 * | 11/2001 | Backus | A47J 37/0658 99/421 V |
| 2002/0023547 A1 * | 2/2002 | Backus | A47J 37/042 99/427 |
| 2002/0108500 A1 * | 8/2002 | Backus | A47J 37/043 99/421 H |
| 2004/0144260 A1 * | 7/2004 | Backus | A47J 37/047 99/421 H |
| 2005/0056633 A1 * | 3/2005 | Backus | A47J 37/041 219/392 |
| 2008/0098902 A1 * | 5/2008 | Mansfield | A47J 37/0786 99/341 |
| 2010/0176170 A1 * | 7/2010 | O'Hare | B60R 9/06 224/519 |
| 2010/0199855 A1 * | 8/2010 | Georgis | A47J 37/043 99/421 V |
| 2010/0297321 A1 * | 11/2010 | Strauch | A47J 37/0718 426/523 |
| 2011/0120442 A1 * | 5/2011 | Duncan | A47J 37/0786 126/25 R |
| 2011/0168155 A1 * | 7/2011 | Gallo | A47J 37/0713 126/25 AA |
| 2012/0037012 A1 * | 2/2012 | Stier | A47J 37/0704 99/421 H |
| 2012/0192723 A1 * | 8/2012 | Pototsky | A47J 37/043 99/421 V |
| 2013/0104745 A1 * | 5/2013 | Stier | A47J 37/0731 99/421 R |
| 2014/0090635 A1 * | 4/2014 | May | G01F 23/20 73/296 |
| 2015/0144010 A1 * | 5/2015 | Carson | A47J 37/041 99/421 R |
| 2017/0143162 A1 * | 5/2017 | Olsen | A47J 37/0786 |
| 2017/0215638 A1 * | 8/2017 | Markussen | A47J 37/0786 |
| 2018/0184841 A1 * | 7/2018 | Bruin-Slot | A47J 37/043 |

* cited by examiner

OIL-LESS FRYER STAND DEVICE

TECHNICAL FIELD

The present invention relates generally to cooking devices, and more particularly to a stand for an oil-less fryer.

BACKGROUND

The statements in this section merely provide background information related to the present disclosure and may not constitute prior art.

Although large meats such as turkeys, duck or whole chickens have traditionally been cooked in an oven or roasted over a fire pit, advances in technology have seen the introduction of newer cooking devices. For example, there are many known types of deep fat turkey fryers that utilize oil to quickly cook such items. Unfortunately, many injuries have occurred using such devices, so more recently we have seen the introduction of oil-less turkey fryers that utilize infrared burners to cook the meat.

Although these oil-less fryers work well to reduce injuries from hot oil, many individuals complain that these fryers do not cook evenly, thus resulting in different portions of the meat being cooked at different temperatures. Moreover, due to the size of these fryers and the fact they have a large drain on the bottom, most individuals are forced to cook with the device located directly on the ground. This position is not optimum, as it allows insects to crawl over the fryer, and makes the users bend to the ground to insert and retrieve the meat from the cooking basket.

Accordingly, it would be beneficial to provide an oil-less fryer stand having an integrated spit for allowing a user to easily cook any type of meat using any type of commercially available oil-less turkey fryer without the drawbacks described above.

SUMMARY OF THE INVENTION

The present invention is directed to an oil-less frying stand device. One embodiment of the present invention can include a main body having a plurality of elongated legs, an upper shelf, a lower shelf, and a plurality of wheels. In one embodiment, the lower shelf can include an enlarged opening for receiving and engaging a 20 lb propane tank.

In one embodiment, a hollow pipe can extend upward from the top surface of the upper shelf. The pipe can include an open top end for receiving an elongated rotisserie spit, and a rotisserie motor can be positioned along the bottom end of the hollow pipe. The pipe can include a cross-sectional shape and size that is suitable for insertion within the drain opening of a commercially available oil-less fat frying device, and the rotisserie motor can engage the rotisserie spit in order to the spit located within the cooking chamber of the frying device.

In one embodiment, a drain opening can be positioned along the top shelf at a location adjacent to the hollow pipe, and a circular-shaped lip can encircle both the drain opening and the pipe. A drain tube can be in communication with the bottom end of the drain opening and can remove liquids from the area within the circular lip.

This summary is provided merely to introduce certain concepts and not to identify key or essential features of the claimed subject matter.

BRIEF DESCRIPTION OF THE DRAWINGS

Presently preferred embodiments are shown in the drawings. It should be appreciated, however, that the invention is not limited to the precise arrangements and instrumentalities shown.

DETAILED DESCRIPTION OF THE INVENTION

Figure 1:
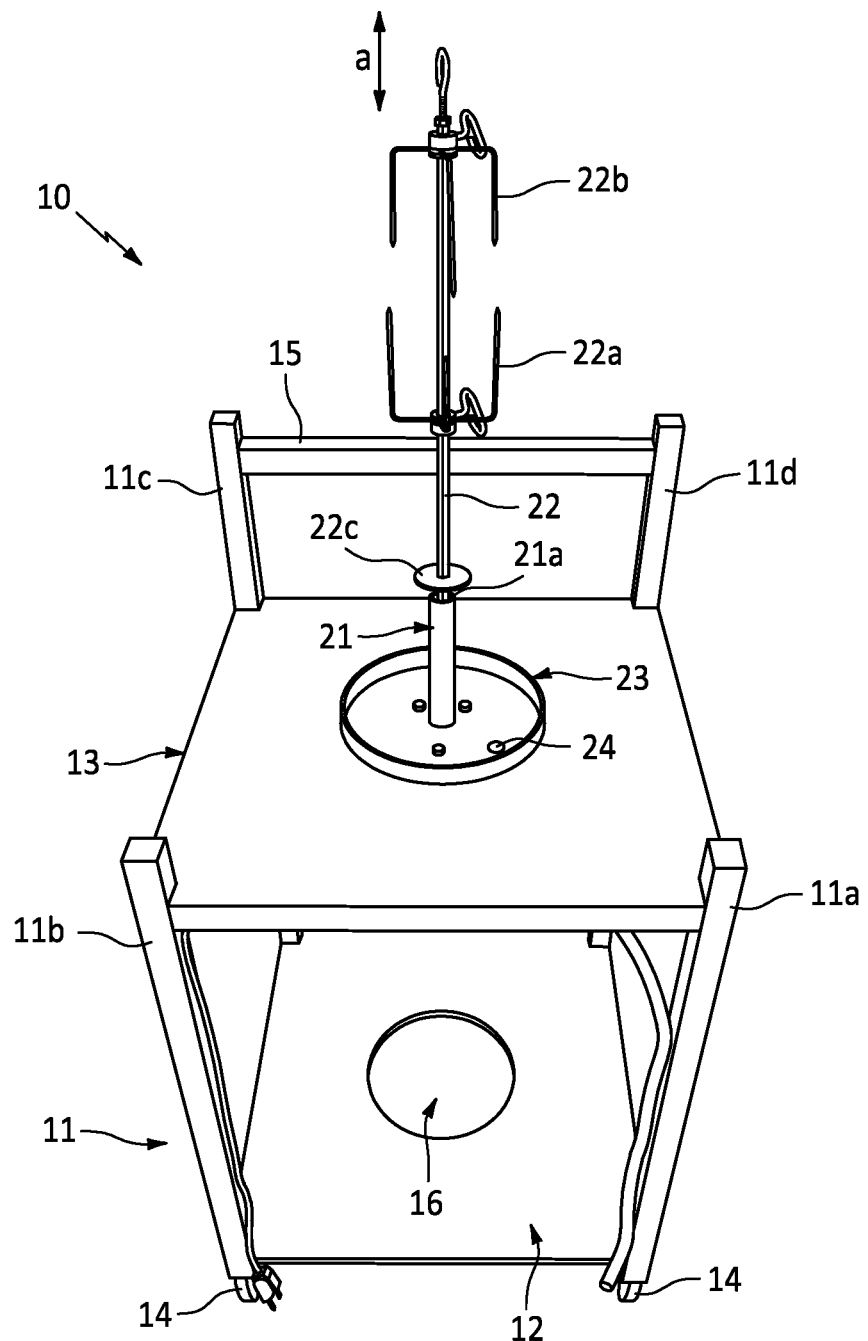
FIG. 1 is a perspective view of an oil-less fryer stand device that is useful for understanding the inventive concepts disclosed herein.

While the specification concludes with claims defining the features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention which can be embodied in various forms. Therefore, specific structural and functional details disclosed herein are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting but rather to provide an understandable description of the invention.

Definitions

As described herein, a "unit" means a series of identified physical components which are linked together and/or function together to perform a specified function.

As described throughout this document, the term "about" "approximately" "substantially" and "generally" shall be used interchangeably to describe a feature, shape or measurement of a component within a tolerance such as, for example, manufacturing tolerances, measurement tolerances or the like.

As described herein, the term "removably secured," and derivatives thereof shall be used to describe a situation wherein two or more objects are joined together in a non-permanent manner so as to allow the same objects to be repeatedly joined and separated.

As described throughout this document, the term "complementary shape," and "complementary dimension," shall be used to describe a shape and size of a component that is identical to, or substantially identical to the shape and size of another identified component within a tolerance such as, for example, manufacturing tolerances, measurement tolerances or the like.

As described herein, the term "connector" includes any number of different elements that work alone or together to repeatedly join two items together in a nonpermanent manner.

FIGS. 1-5 illustrate one embodiment of an oil-less fryer stand device 10 that are useful for understanding the inventive concepts disclosed herein. In each of the drawings, identical reference numerals are used for like elements of the invention or elements of like function. For the sake of clarity, only those reference numerals are shown in the individual figures which are necessary for the description of the respective figure. For purposes of this description, the terms "upper," "bottom," "right," "left," "front," "vertical," "horizontal," and derivatives thereof shall relate to the invention as oriented in FIG. 1.

As described below, the device 10 is intended to be used with any number of commercially available oil-less style frying devices having a centralized cooking chamber with a drain along the bottom of the chamber. Several nonlimiting examples of suitable fryers 1 for use herein include, but are not limited to the Big Easy Oil-less Turkey fryer that is commercially available by CHAR-BROIL®, the Oil-free Electric Turkey Fryer that is commercially available from MASTERBUILT®; and the Tur-infrared Oil-less turkey fryer that is commercially available from CHAR-BROIL®, among others, for example.

FIG. 1 illustrates one embodiment of the oil-less fryer stand device 10 that includes a main body 11 having four elongated legs 11a, 11b, 11c and 11d, that are each connected to a lower shelf 12 and an upper shelf 13. In one embodiment, a plurality of wheels 14 can be positioned along the bottom of the legs, and a handle 15 can be disposed between two of the legs. As shown, a propane tank opening 16 can be positioned centrally within the bottom shelf 12 to receive and engage the bottom end of a standard 20 lb. propane tank, as is known in the art.

In the preferred embodiment, the main body will include the generally square cross-sectional shape so as to maintain a relatively small footprint in order to not occupy a large amount of space when not in use. Also, it is preferred that the main body be constructed metal so as to be suitable for prolonged exposure to adverse weather conditions, along with the high heat and oils encountered while cooking. Although not specifically illustrated, other embodiments are contemplated wherein the area beneath the top shelf is enclosed and includes one or more doors to provide a cabinet area for storage of items in addition to the propane tank.

Although described above with regard to a particular shape, size, or construction material, this is for illustrative purposes only, as any number of other shapes, sizes and/or construction materials are also contemplated. To this end, the main body may be formed from any number of materials that are, for example, relatively strong and stiff for their weight. Several nonlimiting examples include, but are not limited to various metals or metal alloys (e.g., aluminum, steel, titanium, or alloys thereof), plastic/polymers (e.g., high-density polyethylene (HDPE), rigid polyvinyl chloride (PVC), or polyethylene terephthalate (PET)), and/or various composite materials (e.g., carbon fibers in a polymer matrix, fiberglass, etc.), among others, for example.

In one embodiment, an elongated pipe 21 can extend upward from the top surface 13a of the main body. The pipe can comprise a hollow member having an open top end 21a for receiving and engaging the elongated shaft of the removable rotisserie spit 22 as shown by arrow a. In this regard, the rotisserie spit 22 can include any number of meat forks 22a and 22b which can be positioned along the shaft of the spit 22 at different locations. Likewise, the spit can preferably include a generally flat plate 22c. The plate can include a diameter that is greater than the diameter of the pipe opening 21a, and functions to prevent oils and liquids from meat being cooked on the spit from entering the pipe 21 through the open top end 21a.

In one embodiment, a raised lip 23 can be provided along the top surface 13a. As shown, the lip can preferably include a circular shape that functions to encircle the bottom of the pipe 21. Additionally, a drain opening 24 can be positioned along the top surface 13a at a location within the area defined by the lip 23.

Figure 2:
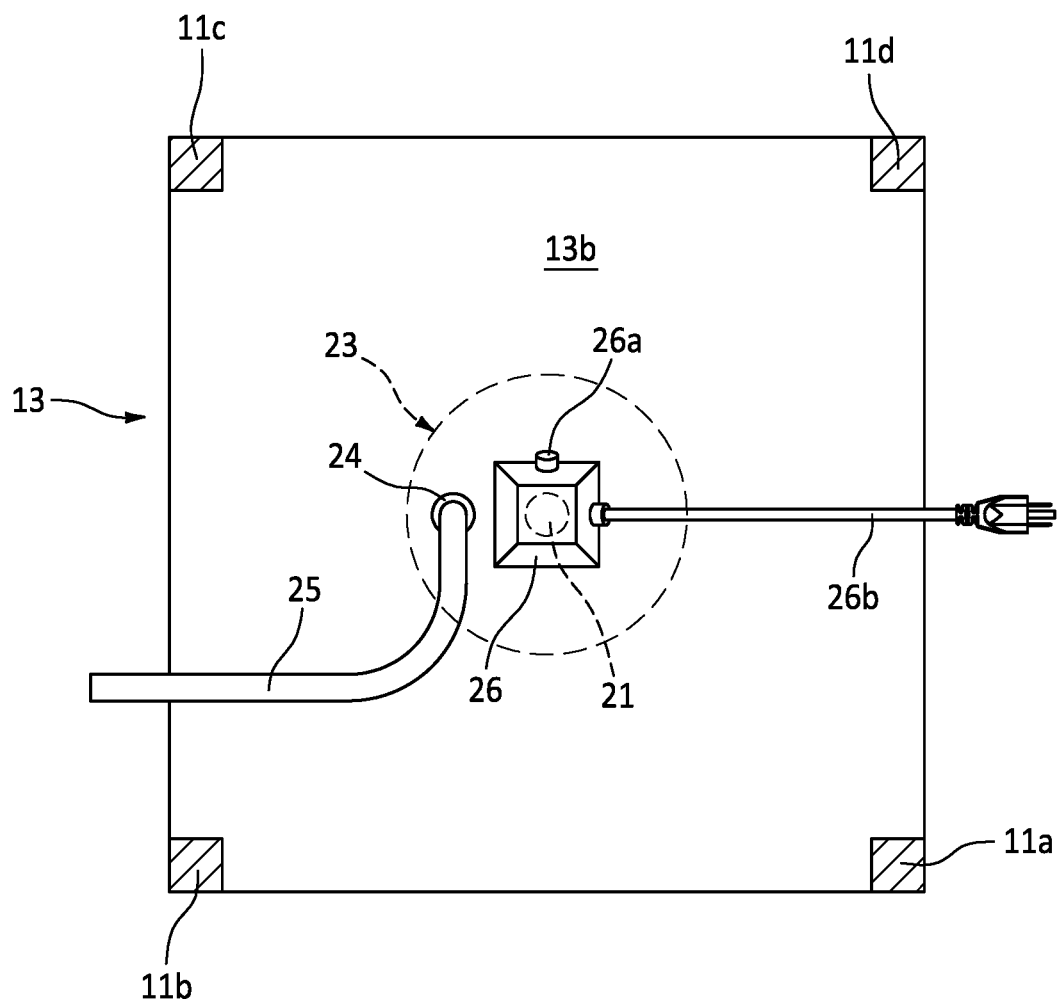
FIG. 2 is a cutout view of the bottom surface of the upper shelf of the oil-less fryer stand device, in accordance with one embodiment of the invention.

As shown best at cutout FIG. 2, a drain tube 25 can be positioned along the bottom surface 13b of the top shelf, and can engage the bottom end of the drain opening 24. Additionally, an electric rotisserie motor 26 can be positioned along the bottom surface 13b so as to engage the bottom end of the pipe 21. The rotisserie motor including a connector for engaging and rotating the bottom end of the spit 22 upon being activated by a control switch 26a. In the preferred embodiment, the motor can include an electric cord 26b so as to receive power from an electrical outlet. However, other embodiments are contemplated wherein the motor is configured to operate using batteries that can be inserted via a battery cavity (not illustrated).

One example of a commercially available rotisserie motor 26 for use herein includes the Universal Grill Electric replacement rotisserie motor that is commercially available from Minostar, for example. Of course, any number of other types of components capable of selectively receiving and rotating the rotisserie spit are also contemplated.

Figure 3:
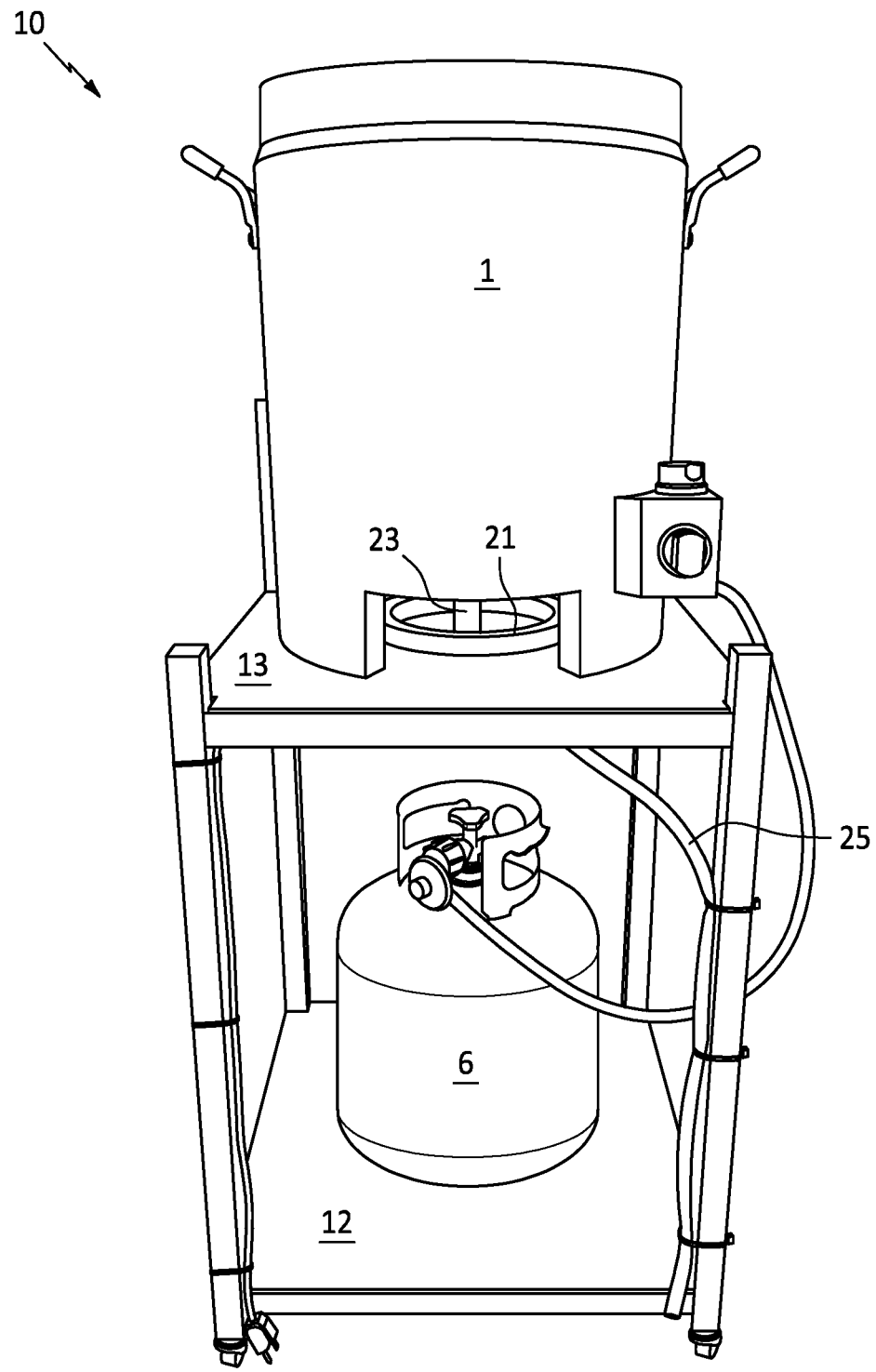
FIG. 3 is a front view of the oil-less fryer stand device in operation, in accordance with one embodiment of the invention.
Figure 4:
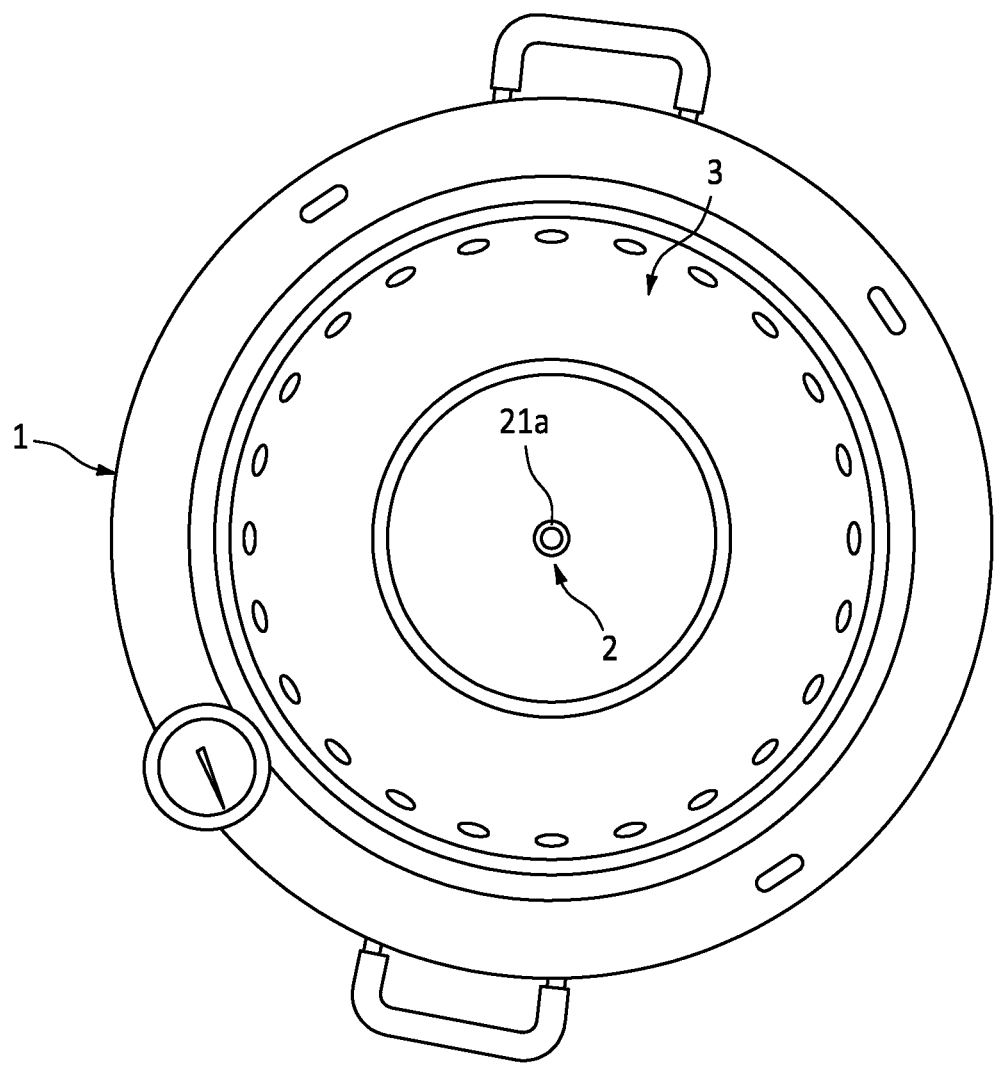
FIG. 4 is a top view of an oil-less fryer that is positioned on the oil-less fryer stand device, in accordance with one embodiment of the invention.
Figure 5:
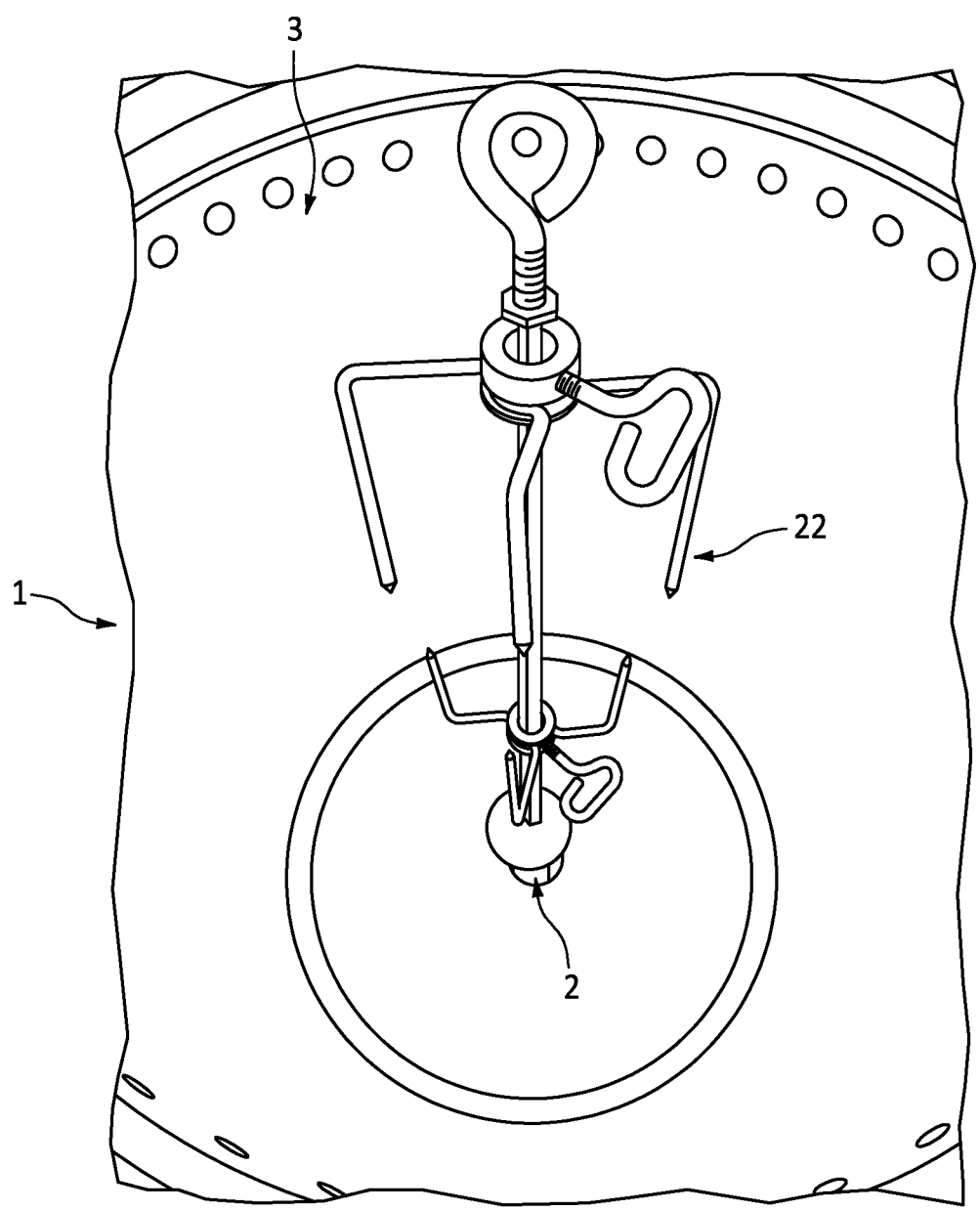
FIG. 5 is another top view of an oil-less fryer that is positioned on the oil-less fryer stand device, in accordance with one embodiment of the invention.

FIGS. 3-5 illustrate one embodiment of the oil-less fryer stand device 10 in operation. As shown, a commercially available oil-less turkey fryer 1 can be positioned onto the top shelf 13 of the device 10 such that the pipe 21 extends through the central drain opening 2 located inside the cooking chamber 3 of the fryer 1.

Next, the spit, 22 can be lowered into the cooking chamber 3 and inserted through the open top end of the pipe 21a until the bottom end of the spit is engaged with the above-described rotisserie motor. Next, the fryer 1 can be connected to a propane tank 6 that can be stored on the bottom shelf 12, and the motor can be plugged into an outlet. Finally, the fryer can be activated to apply heat to the cooking chamber 3, and the rotisserie motor can be switched on to begin rotating the spit located within the chamber.

While cooking, juices, oils and other materials dripping from the meat will pass through the drain opening 2 of the cooking chamber so as to be deposited onto the area of the top shelf 13a encircled by the raised lip 23. At that time, the fluids can pass through the drain opening 24 into the drain tube 25 where they can be discarded.

Accordingly, the above-described oil-less fryer stand device 10 provides an innovative and novel solution for engaging any type of oil-less frying device in a manner that permits a rotisserie spit to rotate meat and other items for even cooking within the fryer. Moreover, the innovative drain system permits oils to be removed from the fryer without modifying the fryer itself and thus voiding the manufacturer warranty.

As described herein, one or more elements of the oil-less fryer stand device 10 can be secured together utilizing any number of known attachment means such as, for example, screws, glue, compression fittings and welds, among others. Moreover, although the above embodiments have been described as including separate individual elements, the inventive concepts disclosed herein are not so limiting. To this end, one of skill in the art will recognize that one or more individually identified elements may be formed together as one or more continuous elements, either through manufacturing processes, such as welding, casting, or molding, or through the use of a singular piece of material milled or machined with the aforementioned components forming identifiable sections thereof.

As to a further description of the manner and use of the present invention, the same should be apparent from the above description. Accordingly, no further discussion relating to the manner of usage and operation will be provided.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Likewise, the term "consisting of" shall be used to describe only those components identified. In each instance where a device comprises certain elements, it will inherently consist of each of those identified elements as well.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. An oil-less frying stand device, said device comprising:
   a main body having a plurality of elongated legs and a first shelf that is in communication with each of the plurality of elongated legs;
   a hollow pipe that is positioned through the first shelf, said hollow pipe having a first end that extends upward from a top surface of the first shelf, and an opening that is positioned above the top surface;
   a rotisserie motor that is positioned along a bottom surface of the first shelf, said rotisserie motor being in communication with a second end of the pipe; and
   a rotisserie spit having a bottom end that is configured to be positioned through the opening on the first end of the hollow pipe and to engage the rotisserie motor,
   wherein the first shelf is positioned at a top end of the main body and includes a flat open surface for removably receiving an oil-less frying device, and
   wherein the first end of the hollow pipe is configured to be positioned through a central drain opening of the oil-less frying device that is removably positioned on the top shelf.

2. The device of claim 1, further comprising:
   a raised lip that is positioned along the top surface of the first shelf.

3. The device of claim 2, wherein the raised lip includes a circular shape.

4. The device of claim 2, wherein the raised lip encircles the hollow pipe.

5. The device of claim 4, further comprising:
   a drain opening that is located along the top surface of the first shelf.

6. The device of claim 5, wherein the drain opening is located within an area encircled by the raised lip.

7. The device of claim 1, wherein the rotisserie motor includes an electric motor having a switch for selectively transitioning the electric motor between an on and off position.

8. The device of claim 1, further comprising:
   a second shelf that is also in communication with each of the plurality of elongated legs.

9. The device of claim 8, further comprising:
   an opening that is positioned centrally through the second shelf.

10. The device of claim 9, wherein the opening includes a shape and size that is complementary to a shape and a size of a propane tank.

11. The device of claim 10, wherein the second shelf includes functionality for removably receiving and storing the propane tank.

12. The device of claim 1, further comprising:
    a plurality of wheels that are in communication with at least two of the plurality of elongated legs.

13. The device of claim 1, further comprising:
    a handle.

14. The device of claim 1, further comprising:
    a flat plate that is positioned adjacent to the bottom end of the rotisserie spit.

15. The device of claim 14, wherein the plate is configured to prevent oil from entering the opening on the first end of the pipe, and said flat plate includes an outside diameter that is greater than an outside diameter of the opening on the first end of the pipe.

* * * * *